United States Patent
Murthy et al.

(10) Patent No.: US 9,940,339 B2
(45) Date of Patent: Apr. 10, 2018

(54) SYSTEM AND METHOD FOR REDUCING FUNCTIONAL AMBIGUITY IN VISUAL CONTENTS

(71) Applicants: Manjunatha Murthy, Bangalore (IN); Srinivas Adayapak, Bangalore (IN); Aswath Fazil Khan Sabudeen, Bangalore (IN)

(72) Inventors: Manjunatha Murthy, Bangalore (IN); Srinivas Adayapak, Bangalore (IN); Aswath Fazil Khan Sabudeen, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 395 days.

(21) Appl. No.: 14/748,203

(22) Filed: Jun. 23, 2015

(65) Prior Publication Data
US 2016/0283587 A1    Sep. 29, 2016

(30) Foreign Application Priority Data
Mar. 28, 2015 (IN) .......................... 1602/CHE/2015

(51) Int. Cl.
*G06F 17/30*    (2006.01)
*G06F 3/0484*   (2013.01)

(52) U.S. Cl.
CPC .............. *G06F 17/30247* (2013.01)

(58) Field of Classification Search
CPC ........ G06F 17/30247; G06F 17/30713; G06F 17/30719; G06F 17/30899; G06F 17/30256; G06F 17/30265; G06F 17/30268; G06F 17/30277; G06F 3/0484; G06F 17/2785; G06F 17/30259; G06F 17/3028; G06F 17/30525; G06N 5/022; G06N 5/04;
(Continued)

(56) References Cited

U.S. PATENT DOCUMENTS 6,289,304 B1    9/2001  Grefenstette
7,496,411 B2    2/2009  Nakamura
(Continued)

OTHER PUBLICATIONS

Discovering Object Functionality Bangpeng Yao; Jiayuan Ma; Li Fei-Fei 2013 IEEE International Conference on Computer Vision Year: 2013 pp. 2512-2519.*

(Continued)

*Primary Examiner* — Kim Vu
*Assistant Examiner* — Michael Vanchy, Jr.
(74) *Attorney, Agent, or Firm* — Finnegan, Henderson, Farabow, Garrett & Dunner LLP

(57) ABSTRACT

The present disclosure relates to a method and a system for reducing functional ambiguity from an image. In one embodiment, an input image is received and processed to identify objects. Spatial proximity score of the identified objects are determined based on which functional proximity score of functionalities associated with the identified objects is further determined. Upon determining the functional proximity score, possible domain of all the functionalities associated with the identified objects is determined. Further, a domain score is determined based on which the ambiguity of the domain related to the input image is reduced. A text summary of objects, functionalities and possible domains associated with the input image is then generated upon mapping with one or more user profiles and displayed to end user.

18 Claims, 4 Drawing Sheets

(58) Field of Classification Search
CPC ........ G06N 5/02; G06N 7/005; G06N 99/005; G06K 9/6267; G06K 9/78; G06K 9/6201; G06K 9/6215; G06K 9/6217; G06K 9/6218; Y10S 707/99933; Y10S 707/99945; Y10S 707/99948; G10L 13/00
See application file for complete search history.

(56) References Cited

U.S. PATENT DOCUMENTS

| | | |
|---|---|---|
| 8,260,616 B2 | 9/2012 | O'Conor et al. |
| 8,665,345 B2 | 3/2014 | Kam et al. |
| 2014/0278291 A1 | 9/2014 | Zheng et al. |
| 2016/0110793 A1* | 4/2016 | Herring .............. G01G 19/4144 705/26.64 |

OTHER PUBLICATIONS

Jonathan Rubin, et al. "508 Accessible Videos—How to Make Audio Descriptions," DIGITALGOV, Jun. 30, 2015 (5 pages), available at http://www.digitalgov.gov/2014/06/30/508-accessible-videos-how-to-make-audio-descriptions/.

Andrej Karpathy and Li Fei-Fei, "Deep Visual Semantic Alignments for Generating Image Descriptions," Apr. 2015 (17 pages), available at http://cs.stanford.edu/people/karpathy/deepimagesent/devisagen.pdf.

Oriol Vinyals, et al. "A picture is worth a thousand (coherent) words: building a natural description of images," Google Research Blog, Nov. 17, 2014 (4 pages), available at http://googleresearch.blogspot.in/2014/11/a-picture-is-worth-thousand-coherent.html.

* cited by examiner

SYSTEM AND METHOD FOR REDUCING FUNCTIONAL AMBIGUITY IN VISUAL CONTENTS

PRIORITY CLAIM

This U.S. patent application claims priority under 35 U.S.C. § 119 to: India Application No. 1602/CHE/2015, filed Mar. 28, 2015. The entire content of the aforementioned application is incorporated herein by reference.

FIELD OF THE DISCLOSURE

The present subject matter is related, in general to content management, and more particularly, but not exclusively to method and system for reducing functional ambiguity in visual contents.

BACKGROUND

Generally, visual content including images or videos that convey the exact message are difficult to create. Typically creators select or create images based on the perception and knowledge of the creators in order to communicate the specific function or relationship of objects in the images. As our language and communication carries ambiguity, the viewer of these images may get a completely different message upon viewing the images. In the absence of the creator of the images, the user or viewer's interpretation of the images will vary as compared to the original message, hence creating ambiguity in the interpretation of the images. Further, the viewer's knowledge, experience and perception guide the functional interpretation of the visual content and hence vary with respect to different users leading to subjectivity in the communication. As the amount of content increases, the subjectivity and ambiguity also increases. Further, the availability of the creator and the user in the same space and time is not always feasible to reduce the ambiguity.

Therefore, there is a need for method and system for reducing functional ambiguity in the visual content and overcoming the disadvantages and limitations of the existing systems.

SUMMARY OF THE DISCLOSURE

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of reducing functional ambiguity from an image. The method comprising the steps of identifying at least one object in the image based on object data received from an object repository, wherein each of the at least one object is annotated with description data. For each of the at least one object, a relative spatial proximity score is determined based on a proximity distance among the at least one identified object. Further, the method comprises a step of determining a functional proximity score for each of the at least one proximal object based on one or more functionalities, associated with the at least one proximal object, extracted from the object repository. Upon determining the functional proximity score, one or more domains, from a knowledge repository, associated with each of the one or more functionalities is identified and a domain score for each of the one or more domains is determined. The domain score is determined based on the relative spatial proximity score, the functional proximity score and one or more user profiles of the users obtained from the knowledge repository. Based on the domain score, the functional ambiguity from the image is reduced by associating a domain and at least one functionality associated with the at least one object.

Further, the present disclosure relates to a system for reducing functional ambiguity from an image. The system comprises a processor and a memory communicatively coupled to the processor, wherein the memory stores processor-executable instructions, which, on execution, cause the processor to identify at least one object in the image based on the object data received from the object repository. The processor is furthermore configured to determine a relative spatial proximity score for each of the at least one object based on a proximity distance among the at least one identified object. The processor is also configured to determine a functional proximity score for each of the at least one proximal object based on one or more functionalities, associated with the at least one proximal object, extracted from the object repository. The processor is further configured to identify one or more domains, from the knowledge repository, associated with each of the one or more functionalities and compute a domain score for each of the one or more domains. The processor computes the domain score based on the relative spatial proximity score, the functional proximity score and one or more user profiles of the users obtained from the knowledge repository. Based on the domain score, the functional ambiguity from the image is reduced by associating a domain and at least one functionality associated with the at least one object.

Furthermore, the present disclosure relates to a non-transitory computer readable medium including instructions stored thereon that when processed by at least one processor cause a system to perform the act of identifying at least one object in the image based on the object data received from the object repository. Further, the instructions cause the processor to determine a relative spatial proximity score for each of the at least one object based on a proximity distance among the at least one identified object. The processor is also configured to determine a functional proximity score for each of the at least one proximal object based on one or more functionalities, associated with the at least one proximal object, extracted from the object repository. Furthermore, the instructions cause the processor to identify one or more domains, from the knowledge repository, associated with each of the one or more functionalities and compute a domain score for each of the one or more domains. Still further, the instructions cause the processor to compute the domain score based on the relative spatial proximity score, the functional proximity score and one or more user profiles of the users obtained from the knowledge repository. Based on the domain score, the functional ambiguity from the image is reduced by associating a domain and at least one functionality associated with the at least one object.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
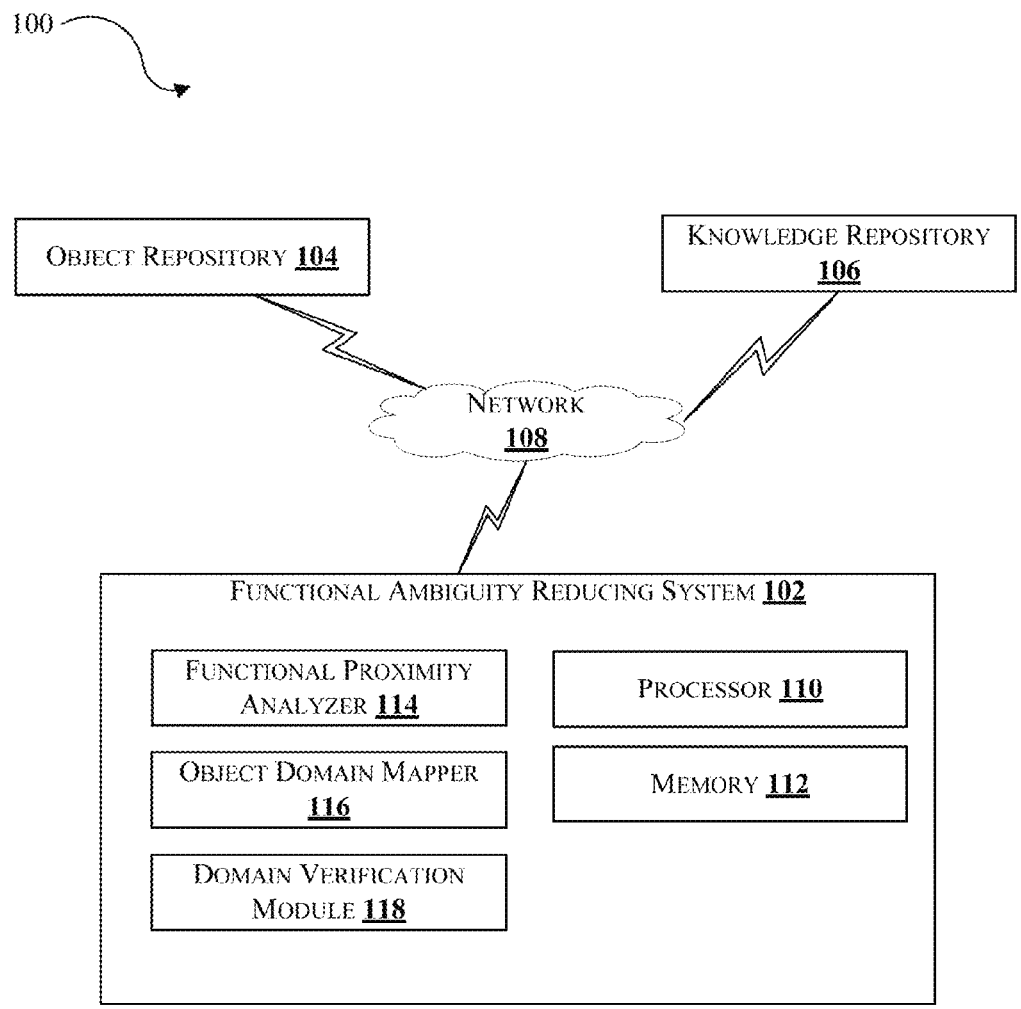
FIG. 1 illustrates an architecture diagram of an exemplary system for reducing functional ambiguity from a visual content in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for reducing functional ambiguity from a visual content. In an example, the visual content may be a static image. In one embodiment, an input image is received and processed to identify objects. Spatial proximity score of the identified objects are determined based on which functional proximity score of functionalities associated with the identified objects is further determined. The functional proximity score is determined based on the functional distance between the functionalities of the identified objects. Functionalities associated with the identified objects are retrieved from a knowledge repository. Upon determining the functional proximity score, possible domain of all the functionalities associated with the identified objects is determined from the knowledge repository. Further, a domain score is determined based on which the ambiguity of the domain related to the input image is determined. A text summary of objects, functions and possible domains associated with the input image is then generated upon mapping with one or more user profiles and displayed to end user. Thus, the misinterpretation of message conveyed by the input image to the end user is reduced. Further, learning of unknown objects, unknown functions and unknown domains and different end user perspectives is enabled so as to create a persistent knowledge and object repositories.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an architecture diagram of an exemplary system 100 for reducing functional ambiguity from an image in accordance with some embodiments of the present disclosure;

As shown in FIG. 1, the exemplary system 100 comprises one or more components configured to reduce functional ambiguity from an image. In one embodiment, the exemplary system 100 comprises a functional ambiguity reduction system 102 (hereinafter referred to as FARS 102), an object repository 104 and a knowledge repository 106 connected via a communication network 108. The FARS 102 enables reduces ambiguity from an image using data and information stored in the object repository 104 and the knowledge repository 106. In one embodiment, the object repository 104 and the knowledge repository 106 may be integrated within the EARS 102. In another embodiment, the object and the knowledge repositories 104 and 106 may be independent of FARS 102.

The object repository 104, in one embodiment, stores one or more objects captured by an image capturing device and also stores information about the objects such as sentence descriptions, physical characteristics and so on. The object repository 104 also provides linkages to one or more image repositories including open source image repositories, image hosting repositories, social media and creators own repository and so on. The object repository 104 may also store possible associated functional characteristics of each object. The object repository 104 also enables learning of unknown objects provided by user.

The knowledge repository 106 stores one or more object functionalities associated with the objects, domain specific data and one or more user profiles associated with one or more users. In one embodiment, the knowledge repository 106 comprises one or more tuples, each tuple comprising at least the visual content, possible functionalities associated with objects of the image, domains specific to the functions and matching user profiles. The knowledge repository 106 is a persistent repository that enables the creator or originator of the image to access and update the data stored in the knowledge repository 106. In one aspect, the knowledge repository 106 provides a user interface to the creator to provide authorized access to the creator or originator for updating the at least one tuple comprising the possible functions, specific domain and the user profiles.

Figure 2:
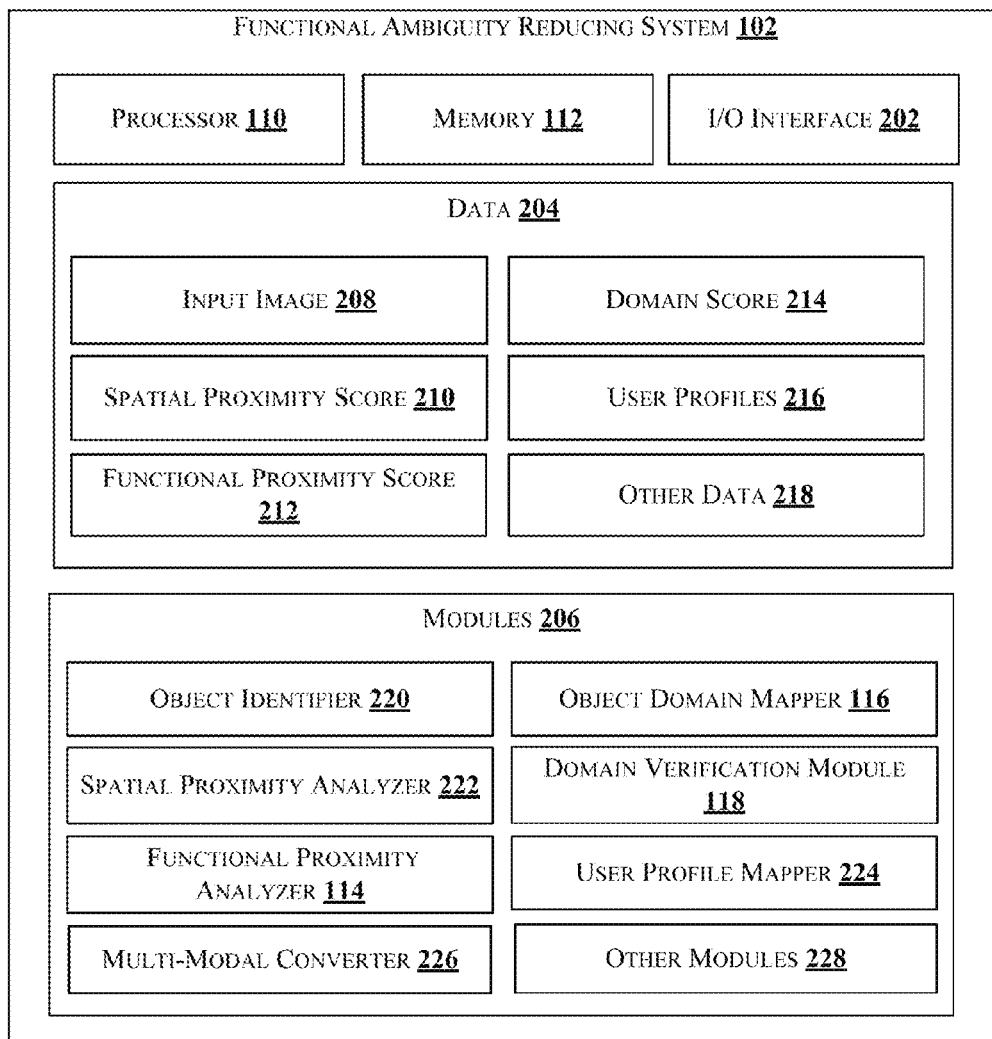
FIG. 2 illustrates an exemplary block diagram of an ambiguity reduction system of FIG. 1 in accordance with some embodiments of the present disclosure.

The FARS 102 reduces the ambiguity from the image using the information and data retrieved from the object repository 104 and the knowledge repository 106. In one embodiment, the FARS 102 comprises a central processing unit ("CPU" or "processor") 110, a memory 112, a functional proximity analyzer 114, an object domain mapper 116 and a domain verification module 118. The FARS 102 may be a typical FARS as illustrated in FIG. 2. The FARS 102 comprises the processor 110, the memory 112 and an I/O interface 202. The I/O interface 106 is coupled with the processor 110 and an I/O device. The I/O device is configured to receive inputs via the I/O interface 106 and transmit outputs for displaying in the I/O device via the I/O interface 106.

The FARS 102 further comprises data 204 and modules 206. In one implementation, the data 204 and the modules 206 may be stored within the memory 104. In one example, the data 204 may include input image 208, spatial proximity score 210), functional proximity score 212, domain score 214, one or more user profiles 216 and other data 218. In one embodiment, the data 204 may be stored in the memory 104 in the form of various data structures. Additionally, the aforementioned data can be organized using data models, such as relational or hierarchical data models. The other data 218 may be also referred to as reference repository for storing recommended implementation approaches as reference data. The other data 218 may also store data, including temporary data and temporary files, generated by the modules 206 for performing the various functions of the system 102.

The modules 206 may include, for example, the functional proximity analyzer 114, object domain mapper 116, the domain verification module 118, an object identifier 220, a spatial proximity analyzer 222, a user profile mapper 224, and a multi-modal converter 226. The modules 206 may also comprise other modules 228 to perform various miscellaneous functionalities of the system 102. It will be appreciated that such aforementioned modules may be represented as a single module or a combination of different modules. The modules 206 may be implemented in the form of software, hardware and or firmware.

The FARS 102 receives the input image 208 captured by an image sensor or an image capturing device from one or more users and processes the received input image 208 to reduce the ambiguity in the interpretation of the received input image 208. In one embodiment, the object identifier 220 of the FARS 102 processes the received input image 208 to identify one or more objects from the input image 208. In one aspect, the object identifier 220 extracts multiple regions from the input image 208 and computes one or more features using known techniques for example, convolutional neural networks. Upon classifying the regions into one or more classes, the object identifier 220 generates scores for each extracted feature using known techniques like Support Vector Machines (SVM) and identifies the one or more objects based on the generated scores. On identification of the one or more objects, the object identifier 220 annotates the known objects and annotates the unknown identified objects based on inputs provided by the creator. In another aspect, the object identifier 220 identifies the one or more objects using known image processing techniques. Upon identifying the one or more objects, the FARS 102 determines a relative spatial proximity score of the one or more identified objects.

In one embodiment, the spatial proximity analyzer 222 determines the relative spatial proximity score 210 with respect to the one or more objects. For example, the spatial proximity score 210 between any two objects may be any one of closer, far, near, no proximity etc. The spatial proximity analyzer 222 determines a spatial score for each of the one or more objects using techniques like Self-Organizing Map (SOM) based on proximity distance between the one or more objects and identifies a predefined number of objects from among the one or more objects based on the spatial score. In one embodiment, the spatial proximity analyzer 222 determines the top 'N' number of objects from among the one or more objects based on spatial score and determines term or word representation of top N number of objects based on corresponding top N annotated words of the N objects. In one aspect, the spatial proximity analyzer 222 provides one or more terms corresponding to the predefined 'N' number of objects using a Bidirectional Recurrent Neural Network (BRNN) and compute the term representation. Based on the computed term representation, the spatial proximity analyzer 222 determines the relative spatial proximity score 210 for each of the at least one object based on the term representation. The spatial proximity analyzer 222 generates a tuple comprising the one or more top N objects, corresponding annotated words, description and spatial proximity score 210 and provide the generated tuple to the functional proximity analyzer 114 for further processing. Example of the output generated by the spatial proximity analyzer 222 is illustrated in the Table 1 below.

TABLE 1

| Identified Objects | Annotation(word) | Description | Spatial Proximity score |
| --- | --- | --- | --- |
| Scissor | Scissor | Kitchen Scissor | Close to pressure cooker |
|  |  | Tailoring Scissor | Close to sewing machine |
|  |  | Surgical Scissor | Close to surgical tray |

The functional proximity analyzer 114 receives the above mentioned tuples as illustrated in table 1 as input and determines a functional proximity score 212 for the one or more objects based on one or more functionalities associated with the one or more objects. In one embodiment, the functional proximity analyzer 114 determines one or more functionalities associated with the one or more objects from the object repository 104 and determines functional proximity score 212 of the one or more functionalities that have similar semantic features. In one aspect, the functional proximity analyzer 114 identifies one or more nearest neighbouring functionalities using known techniques. For example, the functional proximity analyzer 114 performs Markov Random Walk for at least 'n' number of iterations and determines the nearest neighbouring functionalities having similar semantics. A functional proximity tree is constructed using the Binary Interaction with the one or more objects that are spatially closer and the one or more functionalities associated with the spatially closer objects. By Random Walk through the functional proximity tree, the nearest neighbouring functionalities of the spatially closer objects are identified.

Upon identifying the nearest neighbouring functions, the functional proximity analyzer 114 determines the functional proximity score 212 by computing the functional distance between a functionality and the corresponding nearest neighbouring functions and maps the functional proximity score 212 to the respective objects that are spatially proximal. In one example, the functional proximity score 212 is determined as scalar product of two distance vectors of corresponding two functionalities. If there is no relation between the two functionalities, then the functional proximity score 212 is 0, otherwise the functional proximity score 212 may vary based on the degree of spatial proximity. For example, the functional proximity score 212 may have one or more range of values for different degrees of spatial proximity like 0.75 to 1 for closer, 0.5 to 0.75 for near, 0.2 to 0.5 for far, 0 to 0.2 no proximity. Let us consider the following illustration.

For an input image, there are N objects identified by the spatial proximity analyzer 222 based on the spatial proximity score 210. The functional proximity analyzer 114 derives one or more functionalities including Function 1, Function 2, . . . Function N associated with each of the 1 . . . N objects as illustrated below.

Object 1 → Function 1 ... Function N

Object 2 → Function 1 ... Function N

⋮

Object N → Function 1 ... Function N

For each of the object that are identified from the input image, a nearest neighbouring functionality, is identified by Markov Random Walk or any known techniques, as illustrated below.

Object 1 - - - Function 1, Object 2 - - - Function 2

Object 2 - - - Function 1, Object 5 - - - Function 2, Object 8 - - - Function 7

Object 3 - - - Function 1, Object 2 - - - Function 6

Upon identifying the nearest functionalities, the functional proximity score 212 is determined between the nearest neighboring functionalities by calculating the functional distance between the proximity functionalities and the nearest functionalities are mapped to the corresponding spatial proximity score of the spatially closer objects as illustrated below.

Object 1 - - - Function 1, Object 2 - - - Function 2 (Closer)

Object 2 - - - Function 1, Object 5 - - - Function 2 (Closer)

Object 5 - - - Function 2, Object 8 - - - Function 7 (Far)

Object 2 - - - Function 1, Object 8 - - - Function 7 (Closer)

Object 3 - - - Function 1, Object 2 - - - Function 6 (Closer)

Upon mapping, one or more domains associated with the one or more functionalities are identified from the knowledge repository 106 and a domain functional proximity score or a domain score 214 for each of the one or more domains is determined.

In one embodiment, the object domain mapper 116 determines one or more possible domains related to the one or more functionalities from the knowledge repository 106. A domain comprises a set of specific functionalities related to for example, a concept or profession or industry or so on. The object domain mapper 116 retrieves one or more domains associated with the one or more functionalities from the knowledge repository 106 and computes the domain score 214 by calculating the total of functional proximity score of one or more domains associated with the one or more functionalities. The object domain mapper 116 generates an output matrix of the at least one object, the one or more functionalities and the one or more domains and applies known techniques like cocycle base and maxmaxflow algorithms to determine an ambiguity factor. In one embodiment, the ambiguity factor is determined by the cocycle base and maxmaxflow algorithms by comparing the domain scores 214 of the one or more domains and selecting a possible domain as associated with the image 208 based on the comparison.

TABLE 2

| Object functions | Object functions | Spatial Proximity | Functional Proximity score | Domain |
|---|---|---|---|---|
| O1-F1 | O2-F1 | No proximity | 0 | |
| O1-F1 | O2-F2 | Closer | 0.8 | D1 |
| O1-F1 | O2-F3 | No proximity | 0 | |
| O1-F1 | O2-F4 | No proximity | 0 | |
| O1-F1 | O2-F5 | Far | 0.01 | D2 |
| O2-F1 | O5-F2 | Closer | 0.8 | D1 |
| O2-F1 | O4-F7 | Far | 0.2 | D2 |
| O3-F1 | O2-F4 | Near | 0.6 | D1 |

For domain D1, considering the objects O1, O2, O3 and O4, the total functional proximity score is determined as 2.2 and for domain D2, considering the objects O1, O2, and O4, the domain score is determined as 0.21. The object domain mapper 116 selects one possible domain D1 among the domains D1 and D2 and identifies one possible domain as D1 as associated with the input image 208 and hence no ambiguity is found.

In another example, as illustrated in table 3 below, the object domain mapper 116 selects two possible domains D1 and D2 having closer domain scores 214 and hence detects ambiguity between the selected domains D1 and D2.

TABLE 3

| Object functions | Object functions | Proximity | Functional Proximity score | Domain |
|---|---|---|---|---|
| O1-F1 | O2-F1 | No proximity | 0 | |
| O1-F1 | O2-F2 | Closer | 0.9 | D1 |
| O1-F1 | O2-F3 | No proximity | 0 | |
| O1-F1 | O2-F4 | No proximity | 0 | |
| O1-F1 | O2-F5 | Closer | 0.9 | D2 |
| O2-F1 | O5-F2 | Closer | 0.8 | D1 |
| O2-F1 | O4-F7 | Closer | 0.7 | D2 |
| O2-F1 | O3-F1 | Near | 0.5 | D2 |
| O3-F1 | O2-F4 | Near | 0.6 | D1 |

For the domain D1, the objects are O1, O2, O3, O4 & O5 with domain score of 2.3 and for the domain D2, the objects are O1, O2 & O5 with domain score of 2.1. The object domain mapper 116 detects ambiguity between the domains D1 and D2 upon comparing the domain scores 214 of the respective domains D1 and D2.

The domain verification module 118 enables the creator to reduce ambiguity by providing one possible domain as associated with the input image 208. In one embodiment, the domain verification module 118 enables the creator to choose one of the domains to reduce ambiguity detected by the object domain mapper 116. In another embodiment, the domain verification module 118 enables the creator to input a new domain to reduce the ambiguity if the creator is unable to select one possible domain. The input domain provided by the creator is also updated into the knowledge repository 106.

The user profile mapper 224 retrieves one or more user profiles 216 from the knowledge repository 106 and maps the verified domain to the one or more user profiles 216 thus retrieved. The one or more mapped user profiles and the verified domain along with associated objects and functionalities are used to generate text summary of the description of the input image 208. In one embodiment, the domain verification module 118 generates an annotated text summary of objects, associated functions and verified domains. The multi-modal converter 226 converts the generated text summary into corresponding audio signal that is provided to the user as output.

The present disclosure reduces the ambiguity of interpretation of the message conveyed by the images to the end user. The system 100 also helps the creator to discover unknown domains and unknown objects conveyed by the input images and thus facilitating learning by the system 100 and making a persistent object repository 104 and knowledge repository 106.

Figure 3:
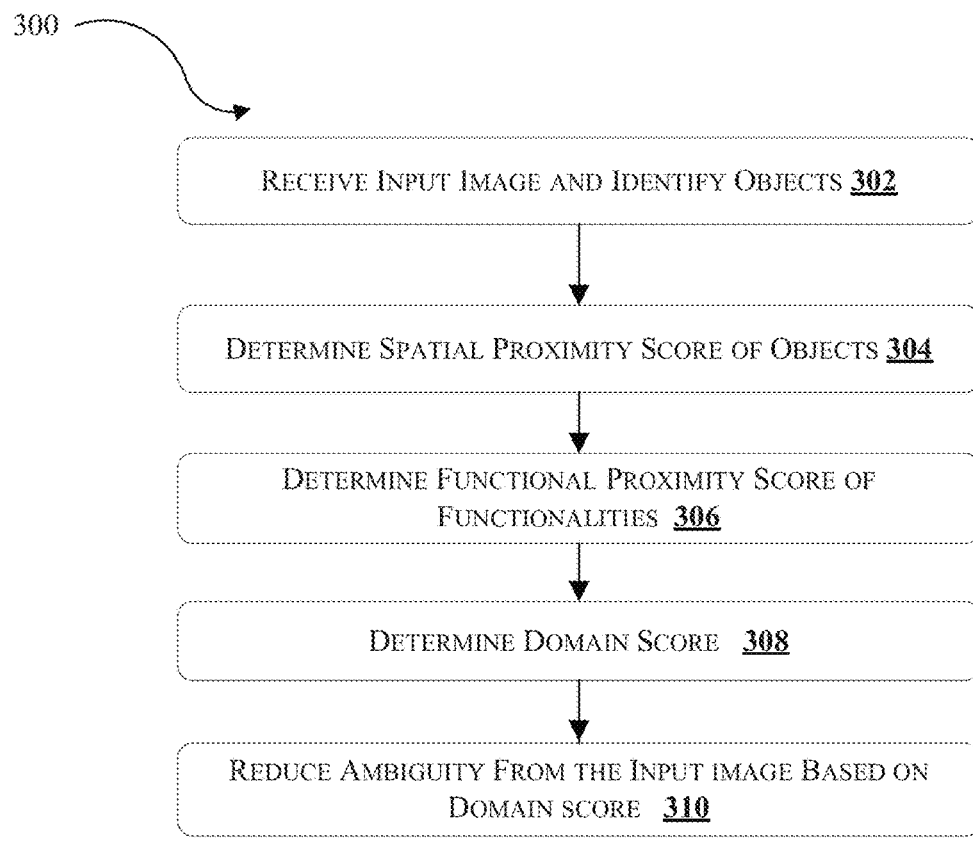
FIG. 3 illustrates a flowchart of an exemplary method of reducing functional ambiguity from an image in accordance with some embodiments of the present disclosure.

FIG. 3 illustrates a flowchart of a method of predicting timely delivery of telecom service orders in real time in accordance with some embodiments of the present disclosure.

As illustrated in FIG. 3, the method 300 comprises one or more blocks implemented by the processor 108 for reducing functional ambiguity from an image. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, receive input image and identify objects. In one embodiment, FARS 102 receives the input image 208 captured by an image sensor or an image capturing device from one or more users and processes the received input image 208 to reduce the ambiguity in the interpretation of the received input image 208. In one embodiment, the object identifier 220 of the FARS 102 processes the received input image 208 to identify one or more objects from the input image 208. In one aspect, the object identifier 220 extracts multiple regions from the input image 208 and computes one or more features using known techniques for example, convolutional neural networks. Upon classifying the regions into one or more classes, the object identifier 220 generates scores for each extracted feature using known techniques like Support Vector Machines (SVM) and identifies the one or more objects based on the generated scores. On identification of the one or more objects, the object identifier 220 annotates the known objects and annotates the unknown identified objects based on inputs provided by the creator. In another aspect, the object identifier 220 identifies the one or more objects using known image processing techniques.

At block 304, determine spatial proximity score of objects. In one embodiment, the spatial proximity analyzer 222 determines the relative spatial proximity score 210 with respect to the one or more objects. For example, the spatial proximity score 210 between any two objects may be any one of closer, far, near, no proximity etc. The spatial proximity analyzer 222 determines a spatial score for each of the one or more objects using techniques like Self-Organizing Map (SOM) based on proximity distance between the one or more objects and identifies a predefined number of objects from among the one or more objects based on the spatial score. In one embodiment, the spatial proximity analyzer 222 determines the top 'N' number of objects from among the one or more objects based on spatial score and determines term or word representation of top N number of objects based on corresponding top N annotated words of the N objects. In one aspect, the spatial proximity analyzer 222 provides one or more terms corresponding to the predefined 'N' number of objects using a Bidirectional Recurrent Neural Network (BRNN) and compute the term representation. Based on the computed term representation, the spatial proximity analyzer 222 determines the relative spatial proximity score 210 for each of the at least one object based on the term representation. The spatial proximity analyzer 222 generates a tuple comprising the one or more top N objects, corresponding annotated words, description and spatial proximity score 210 and provide the generated tuple to the functional proximity analyzer 114 for further processing.

At block 306, determine functional proximity score of functionalities. In one embodiment, the functional proximity analyzer 114 determines one or more functionalities associated with the one or more objects from the object repository 104 and determines functional proximity score 212 of the one or more functionalities that have similar semantic features. In one aspect, the functional proximity analyzer 114 identifies one or more nearest neighbouring functionalities using known techniques. For example, the functional proximity analyzer 114 performs Markov Random Walk for at least 'n' number of iterations and determines the nearest neighbouring functionalities having similar semantics. A functional proximity tree is constructed using the Binary Interaction with the one or more objects that are spatially closer and the one or more functionalities associated with the spatially closer objects. By Random Walk through the functional proximity tree, the nearest neighbouring functionalities of the spatially closer objects are identified.

Upon identifying the nearest neighbouring functions, the functional proximity analyzer 114 determines the functional proximity score 212 by computing the functional distance between a functionality and the corresponding nearest neighbouring functions and maps the functional proximity score 212 to the respective objects that are spatially proximal. In one example, the functional proximity score 212 is determined as scalar product of two distance vectors of corresponding two functionalities. If there is no relation between the two functionalities, then the functional proximity score 212 is 0, otherwise the functional proximity score 212 may vary based on the degree of spatial proximity. For example, the functional proximity score 212 may have one or more range of values for different degrees of spatial proximity like 0.75 to 1 for closer, 0.5 to 0.75 for near, 0.2 to 0.5 for far, 0 to 0.2 no proximity.

At block 308, determine domain score. In one embodiment, the object domain mapper 116 determines one or more possible domains related to the one or more functionalities from the knowledge repository 106. A domain comprises a set of specific functionalities related to for example, a concept or profession or industry or so on. The object domain mapper 116 retrieves one or more domains associated with the one or more functionalities from the knowledge repository 106 and computes the domain score 214 by calculating the total of functional proximity score of one or more domains associated with the one or more functionalities. The object domain mapper 116 generates an output matrix of the at least one object, the one or more functionalities and the one or more domains and applies known techniques like cocycle base and maxmaxflow algorithms to determine an ambiguity factor. In one embodiment, the ambiguity factor is determined by the cocycle base and maxmaxflow algorithms by comparing the domain scores 214 of the one or more domains and selecting a possible domain as associated with the image 208 based on the comparison.

At block 310, reduce ambiguity from the input image based on domain score. In one embodiment, the object domain mapper 116 selects one possible domain D1 among the domains D1 and D2 and identifies one possible domain as D1 as associated with the input image 208 and if no ambiguity is found. On the other hand, if the ambiguity between the domains is found, the domain verification module 118 enables the creator to reduce ambiguity by providing one possible domain as associated with the input image 208. In one embodiment, the domain verification module 118 enables the creator to choose one of the domains to reduce ambiguity detected by the object domain mapper 116. In another embodiment, the domain verification module 118 enables the creator to input a new domain to reduce the ambiguity if the creator is unable to select one possible domain. The input domain provided by the creator is also updated into the knowledge repository 106.

The user profile mapper 224 retrieves one or more user profiles 216 from the knowledge repository 106 and maps the verified domain to the one or more user profiles 216 thus retrieved. The one or more mapped user profiles and the verified domain along with associated objects and functionalities are used to generate text summary of the description of the input image 208. In one embodiment, the domain verification module 118 generates an annotated text summary of objects, associated functions and verified domains. The multi-modal converter 226 converts the generated text summary into corresponding audio signal that is provided to the user as output.

The method 300 thus reduces the ambiguity of interpretation of the message conveyed by the images to the end user.

Figure 4:
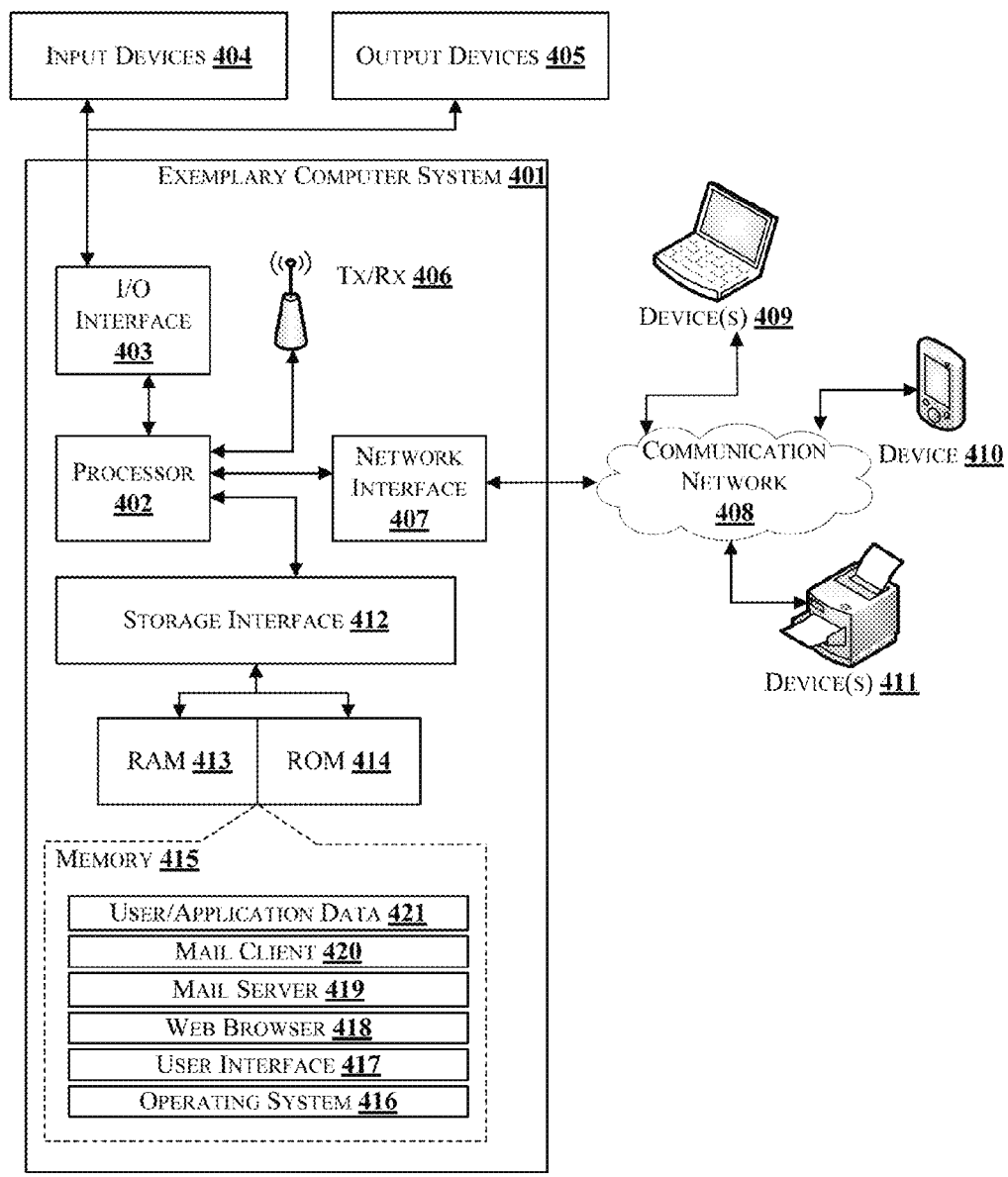
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403.

The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 4Error! Reference source not found.14, etc.) via a storage interface 412. The storage interface may connect to memory devices including, without limitation, memory drives, removable disc drives, etc., employing connection protocols such as serial advanced technology attachment (SATA), integrated drive electronics (IDE), TEEE-1394, universal serial bus (USB), fiber channel, small computer systems interface (SCSI), etc. The memory drives may further include a drum, magnetic disc drive, magnetooptical drive, optical drive, redundant array of independent discs (RAID), solid-state memory devices, solid-state drives, etc.

The memory 415 may store a collection of program or database components, including, without limitation, an operating system 4Error! Reference source not found.16, user interface application 4Error! Reference source not found.17, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 419 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 110, amongst other things, include routines, programs, objects, components, and data structures, which perform particular tasks or implement particular abstract data types. The modules 110 may also be implemented as, signal processor(s), state machine(s), logic circuitries, and/or any other device or component that manipulate signals based on operational instructions. Further, the modules 110 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of reducing functional ambiguity from an image, the method comprising:
   identifying, by a processor of a functional ambiguity determination system, at least one object in the image based on object data received from an object repository, wherein each of the identified at least one object in the image is annotated with description data;
   determining, by the processor, a relative spatial proximity score for each of the identified at least one object in the image based on a proximity distance among the at least one identified object in the image;

determining, by the processor, a functional proximity score for each of the identified at least one object in the image based on one or more functionalities, associated with the identified at least one object in the image, extracted from the object repository;

identifying, by the processor, one or more domains, from a knowledge repository, associated with each of the one or more functionalities;

computing a domain score for each of the one or more domains based on the relative spatial proximity score, the functional proximity score and one or more user profiles of the users obtained from the knowledge repository;

reducing, by the processor, the functional ambiguity from the image by associating a domain and at least one functionality associated with the identified at least one object in the image based on the domain score;

generating, by the processor, a text summary of the domain and the at least one functionality associated with the identified at least one object in the image along with the user profile; and converting, by the processor, the text summary into corresponding audio format to generate an audio summary.

2. The method as claimed in claim 1, wherein the computing the domain score further comprising:

providing the domain score associated with the one or more domains to the user for the user selection; and receiving an input from the user indicating one of a new domain or a selected domain associated with the identified at least one object in the image.

3. The method as claimed in claim 2, further comprising:

updating a user selection of the one or more domains in the knowledge repository based on the input received from the user.

4. The method as claimed in claim 1, wherein determining the relative spatial proximity score for each of the identified at least one object in the image further comprises:

obtaining a spatial score for each of the identified at least one object in the image using Self-Organizing Maps (SOM);

determining a predefined number of object from amongst the identified at least one object based on the spatial score;

providing terms corresponding to the predefined number of objects to a Bidirectional Recurrent Neural Network (BRNN) to compute a term representation; and determining the relative spatial proximity score for each of the identified at least one object in the image based on the term representation.

5. The method as claimed in claim 1, wherein determining the functional proximity score further comprises:

identifying at least one nearest neighbouring functionality of the one or more functionalities based on a markov random walk model;

computing the functional proximity score for each of the one or more functionalities based on a functional distance between a functionality and the nearest neighbouring functionality from amongst the one or more functionalities; and mapping the functional proximity score to corresponding spatial proximal objects identified based on the relative spatial proximity score.

6. The method as claimed in claim 1, wherein computing the domain score for each of the one or more domains further comprises:

computing the domain score based on the functional proximity score associated with at least one functionalities;

obtaining a matrix of the at least one object, the one or more functionalities and the one or more domains; and computing an ambiguity factor by applying at least one of a cocycle base algorithm and a maxmaxflow algorithm to the matrix based on one or more user profiles obtained from knowledge repository.

7. A functional ambiguity determination system for reducing functional ambiguity from an image, comprising:

a processor;

an object repository coupled with the processor, and configured to store at least one object data and annotated description data for at least one object;

a knowledge repository coupled with the object repository and the processor, and configured to store one or more functionalities associated with at least one object, one or more domains associated with the one or more functionalities, and one or more user profiles associated with one or more users; and a memory disposed in communication with the processor and storing processor-executable instructions, the instructions comprising instructions to:

identify at least one object in the image based on the object data received from the object repository;

determine a relative spatial proximity score for each of the identified at least one object image based on a proximity distance among the at least one identified object;

determine a functional proximity score for each of the identified at least one object in the image based on one or more functionalities, associated with the identified at least one object in the image, extracted from the object repository;

identify one or more domains, from the knowledge repository, associated with each of the one or more functionalities;

compute a domain score for each of the one or more domains based on the relative spatial proximity score, the functional proximity score and one or more user profiles of the users obtained from the knowledge repository;

reduce the functional ambiguity from the image by associating a domain and at least one functionality associated with the identified at least one object in the image based on the domain score;

generate a text summary of the domain and the at least one functionality associated with the identified at least one object in the image along with the user profile; and convert the text summary into corresponding audio format to generate an audio summary.

8. The system as claimed in claim 7, wherein the processor is configured to compute the domain score by the steps of:

providing the domain score associated with the one or more domains to the user for the user selection; and receiving an input from the user indicating one of a new domain or a selected domain associated with the identified at least one object in the image.

9. The system as claimed in claim 8, wherein the processor is further configured to:

update a user selection of the one or more domains in the knowledge repository based on the input received from the user.

10. The system as claimed in claim 9, wherein the processor is configured to determine the functional proximity score by performing the steps of:

identifying at least one nearest neighbouring functionality of the one or more functionalities based on a markov random walk model;

computing the functional proximity score for each of the one or more functionalities based on a functional distance between a functionality and the nearest neighbouring functionality from amongst the one or more functionalities; and mapping the functional proximity score to corresponding spatial proximal objects identified based on the relative spatial proximity score.

11. The system as claimed in claim 7, wherein the processor is configured to determine the relative spatial proximity score for each of the identified at least one object in the image by the steps of:

obtain a spatial score for each of the identified at least one object in the image using Self-Organizing Maps (SOM);

determine a predefined number of object from amongst the identified at least one object in the image based on the spatial score;

provide terms corresponding to the predefined number of objects to a Bidirectional Recurrent Neural Network (BRNN) to compute a term representation; and determine the relative spatial proximity score for each of the identified at least one object in the image based on the term representation.

12. The system as claimed in claim 11, wherein the processor is configured to compute the domain score for each of the one or more domains by performing the steps of:

computing the domain score based on the functional proximity score associated with at least one functionalities;

obtaining a matrix of the identified at least one object in the image, the one or more functionalities and the one or more domains; and computing an ambiguity factor by applying at least one of a cocycle base algorithm and a maxmaxflow algorithm to the matrix.

13. A non-transitory computer readable medium including instructions stored thereon that when processed by at least one processor cause a system to perform acts of:

identifying at least one object in the image based on the object data received from the object repository;

determining a relative spatial proximity score for each of the identified at least one object in the image based on a proximity distance among the at least one identified object in the image;

determining a functional proximity score for each of the identified at least one object in the image based on one or more functionalities, associated with the identified at least one object in the image, extracted from the object repository;

identifying one or more domains, from the knowledge repository, associated with each of the one or more functionalities;

computing a domain score for each of the one or more domains based on the relative spatial proximity score, the functional proximity score and one or more user profiles of the users obtained from the knowledge repository;

reducing the functional ambiguity from the image by associating a domain and at least one functionality associated with the identified at least one object in the image based on the domain score;

generating a text summary of the domain and the at least one functionality associated with the identified at least one object in the image along with the user profile; and converting the text summary into corresponding audio format to generate an audio summary.

14. The medium as claimed in claim 13, wherein the instructions, on execution, cause the at least one processor to compute the domain score by the steps of:

providing the domain score associated with the one or more domains to the user for the user selection; and receiving an input from the user indicating one of a new domain or a selected domain associated with the identified at least one object in the image.

15. The medium as claimed in claim 14, wherein the instructions, on execution, further cause the at least one processor to:

update a user selection of the one or more domains in the knowledge repository based on the input received from the user.

16. The medium as claimed in claim 13, wherein the instructions, on execution, cause the at least one processor to determine the relative spatial proximity score for each of the identified at least one object in the image by the steps of:

obtaining a spatial score for each of the identified at least one object in the image using Self-Organizing Maps (SOM);

determining a predefined number of object from amongst the identified at least one object in the image based on the spatial score;

providing terms corresponding to the predefined number of objects to a Bidirectional Recurrent Neural Network (BRNN) to compute a term representation; and determining the relative spatial proximity score for each of the identified at least one object in the image based on the term representation.

17. The medium as claimed in claim 13, wherein the instructions, on execution, cause the at least one processor to determine the functional proximity score by the steps of:

identifying at least one nearest neighbouring functionality of the one or more functionalities based on a markov random walk model;

computing the functional proximity score for each of the one or more functionalities based on a functional distance between a functionality and the nearest neighbouring functionality from amongst the one or more functionalities; and mapping the functional proximity score to corresponding spatial proximal objects identified based on the relative spatial proximity score.

18. The medium as claimed in claim 13, wherein the instructions, on execution, cause the at least one processor to compute the domain score for each of the one or more domains by the steps of:

computing the domain score based on the functional proximity score associated with at least one functionalities;

obtaining a matrix of the identified at least one object in the image, the one or more functionalities and the one or more domains; and computing an ambiguity factor by applying at least one of a cocycle base algorithm and a maxmaxflow algorithm to the matrix.

* * * * *